US012619822B2

(12) United States Patent
Figueredo de Santana et al.

(10) Patent No.: US 12,619,822 B2
(45) Date of Patent: May 5, 2026

(54) RESPONSIBLE PROMPT RECOMMENDATION

(71) Applicant: International Business Machines Corporation, Armonk, NY (US)

(72) Inventors: Vagner Figueredo de Santana, São Paulo (BR); Marisa Affonso Vasconcelos, São Paulo (BR); Melina de Vasconcelos Alberio Guerra, São Paulo (BR); Michael Anthony Feffer, Pittsburgh, PA (US); Sara E Berger, Beaverton, OR (US); Tianyu Su, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 18/408,254

(22) Filed: Jan. 9, 2024

(65) Prior Publication Data

US 2025/0225325 A1     Jul. 10, 2025

(51) Int. Cl.
   *G06F 40/30*        (2020.01)
   *G06F 16/332*       (2025.01)
       (Continued)
(52) U.S. Cl.
   CPC ........ *G06F 40/289* (2020.01); *G06F 16/3322* (2019.01); *G06F 16/3325* (2019.01);
       (Continued)
(58) Field of Classification Search
   None
   See application file for complete search history.

(56) References Cited

U.S. PATENT DOCUMENTS

| | | | |
|---|---|---|---|
| 5,754,737 | A | 5/1998 | Gipson |
| 7,047,241 | B1 | 5/2006 | Erickson |

(Continued)

FOREIGN PATENT DOCUMENTS

| | | |
|---|---|---|
| CN | 107330023 B | 2/2021 |
| CN | 106796602 B | 5/2021 |

(Continued)

OTHER PUBLICATIONS

Machine translation CN-117272988-A. (Year: 2023).*

(Continued)

*Primary Examiner* — Richard Z Zhu
(74) *Attorney, Agent, or Firm* — L. Jeffrey Kelly

(57)         ABSTRACT

An embodiment generates, by analyzing prompts, a prompt template. Each prompt includes a text description of a content to be generated by a model. An embodiment classifies, using a first trained classification model, a variant portion of a prompt into a category in a set of categories. An embodiment selects, from a repository of prompt templates including the prompt template, a selected prompt template having a similarity above a threshold similarity to a first prompt. An embodiment classifies, using the selected prompt template, a variant portion of the first prompt into a first category in the set of categories. An embodiment adjusts, responsive to determining that the first category is designated as a harmful category, the variant portion of the first prompt. An embodiment causes, using the adjusted first prompt, the model to produce a first content.

20 Claims, 8 Drawing Sheets

(51) Int. Cl.

| | | |
|---|---|---|
| *G06F 16/334* | (2025.01) | |
| *G06F 18/2415* | (2023.01) | |
| *G06F 40/289* | (2020.01) | |
| *G06F 16/3329* | (2025.01) | |
| *G06F 16/353* | (2025.01) | |

(52) U.S. Cl.

CPC ........ *G06F 16/334* (2019.01); *G06F 18/2415* (2023.01); *G06F 16/3323* (2019.01); *G06F 16/33295* (2025.01); *G06F 16/3344* (2019.01); *G06F 16/353* (2019.01); *G06F 40/30* (2020.01)

(56) References Cited

U.S. PATENT DOCUMENTS

| | | | |
|---|---|---|---|
| 7,849,399 | B2 | 12/2010 | Hoffmann |
| 8,200,580 | B1 | 6/2012 | Grinchenko et al. |
| 8,201,085 | B2 | 6/2012 | Rollins et al. |
| 8,843,543 | B2 | 9/2014 | Damman et al. |
| 8,966,272 | B2 | 2/2015 | Kiel et al. |
| 9,015,030 | B2 | 4/2015 | Hunter et al. |
| 9,164,982 | B1 | 10/2015 | Kaeser |
| 9,218,333 | B2 | 12/2015 | Liensberger |
| 9,336,184 | B2 | 5/2016 | Mital et al. |
| 9,390,087 | B1 | 7/2016 | Roux et al. |
| 9,977,672 | B2 | 5/2018 | Leupold et al. |
| 10,250,538 | B2 | 4/2019 | Prabhu |
| 10,290,128 | B2 | 5/2019 | Liu et al. |
| 10,474,455 | B2 | 11/2019 | Makkar |
| 10,528,597 | B2 | 1/2020 | Kohlmeier et al. |
| 10,643,144 | B2 | 5/2020 | Bowers et al. |
| 10,936,805 | B2 | 3/2021 | de Mello Brandao et al. |
| 10,970,315 | B2 | 4/2021 | Griffith |
| 11,182,564 | B2 | 11/2021 | Li et al. |
| 11,442,702 | B2 | 9/2022 | Smith et al. |
| 12,079,570 | B1 * | 9/2024 | Mondlock ............... G06F 40/20 |
| 2006/0247914 | A1 | 11/2006 | Brener et al. |
| 2018/0188824 | A1 | 7/2018 | Dunne et al. |
| 2019/0354580 | A1 | 11/2019 | Willmore et al. |
| 2021/0089617 | A1 * | 3/2021 | Li ........................ G06F 3/04883 |
| 2021/0149996 | A1 * | 5/2021 | Bellegarda .......... G10L 15/1815 |
| 2022/0114678 | A1 | 4/2022 | Figueredo de Santana et al. |
| 2023/0051175 | A1 | 2/2023 | Wu et al. |
| 2023/0075182 | A1 | 3/2023 | Galuten |
| 2023/0259705 | A1 | 8/2023 | Tunstall-Pedoe et al. |
| 2024/0160902 | A1 * | 5/2024 | Padgett ................ G06N 3/0895 |
| 2024/0403005 | A1 * | 12/2024 | Friddle ...................... G06F 8/35 |
| 2025/0005299 | A1 * | 1/2025 | Padmanabhan ....... G06F 16/335 |
| 2025/0068741 | A1 * | 2/2025 | Lafon .................. G06F 16/3344 |
| 2025/0094471 | A1 * | 3/2025 | Brenna ............. G06F 16/90332 |
| 2025/0103746 | A1 * | 3/2025 | Gharibi .............. G06F 21/6227 |
| 2025/0111155 | A1 * | 4/2025 | Niu .......................... G06F 40/30 |
| 2025/0124234 | A1 * | 4/2025 | Enes ....................... G06F 40/40 |
| 2025/0124393 | A1 * | 4/2025 | DeRodes ................ G06F 40/20 |
| 2025/0133037 | A1 * | 4/2025 | Jensen .................... H04L 51/02 |
| 2025/0156632 | A1 * | 5/2025 | Sethuraman ............ G06F 40/20 |
| 2025/0165589 | A1 * | 5/2025 | Bannihatti Kumar .. G06F 40/44 |
| 2025/0181844 | A1 * | 6/2025 | Rosset .................... G06F 40/30 |
| 2025/0190853 | A1 * | 6/2025 | Abbas ....................... G06N 7/01 |
| 2025/0209279 | A1 * | 6/2025 | Wang ................. G06F 16/3329 |
| 2025/0209282 | A1 * | 6/2025 | Liu .......................... G06F 16/35 |
| 2025/0217586 | A1 * | 7/2025 | Sinha ...................... G06F 40/20 |
| 2025/0225158 | A1 | 7/2025 | Figueredo De Santana et al. |
| 2025/0238627 | A1 * | 7/2025 | Carrillo ................... G06F 40/40 |
| 2025/0307777 | A1 * | 10/2025 | Kumar ................. G06Q 10/103 |

FOREIGN PATENT DOCUMENTS

| | | |
|---|---|---|
| CN | 112364148 B | 5/2022 |
| CN | 114911947 A | 8/2022 |
| CN | 116415650 A | 7/2023 |
| CN | 116503683 A | 7/2023 |
| CN | 116303980 B | 8/2023 |
| CN | 116522926 A | 8/2023 |
| CN | 116611448 A | 8/2023 |
| CN | 116861921 A | 10/2023 |
| CN | 116958700 A | 10/2023 |
| CN | 116975927 A | 10/2023 |
| CN | 117034907 A | 11/2023 |
| CN | 117035076 A | 11/2023 |
| CN | 117272988 A * | 12/2023 | ........... G06F 40/284 |
| KR | 102197023 B1 | 12/2020 |
| WO | WO-2025093936 A1 * | 5/2025 | ............. G06N 3/006 |

OTHER PUBLICATIONS

Roose, An A.I.-Generated Picture Won an Art Prize. Artists Aren't Happy, Sep. 2, 2022, https://www.nytimes.com/2022/09/02/technology/ai-artificial-intelligence-artists.html.

Kerner, How generative AI and *E. coli* are speeding up new drug discovery, Jan. 10, 2023, https://venturebeat.com/ai/how-generative-ai-and-e-coli-are-speeding-up-new-drug-discovery/.

Creative Commons, About CC Licenses, 2023, https://creativecommons.org/about/cclicenses/.

Koaa, AI-created artwork wins first place at Colorado State Fair, artist receives criticism, Sep. 1, 2022, https://www.koaa.com/news/covering-colorado/ai-created-artwork-wins-first-place-at-coloradostate-fair-artist-receives-criticism.

Jackson, Can You Copyright Your Written AI Prompt, Apr. 22, 2023, https://www.linkedin.com/pulse/can-you-copyright-your-written-ai-prompt-mitch-jackson-esq-.

Farrell, Search-Log Analysis: The Most Overlooked Opportunity in Web UX Research, Jul. 30, 2017, https://www.nngroup.com/articles/search-log-analysis/.

Li et al., Personalized Prompt Learning for Explainable Recommendation, Jan. 13, 2023.

Wu et al., Selective Fairness in Recommendation via Prompts, Jul. 5, 2022.

Wu et al., Personalized Prompt for Sequential Recommendation, Feb. 15, 2023.

Wang et al., Toxicity Detection with Generative Prompt-based Inference, May 24, 2022.

Ronanki et al., Requirements Engineering using Generative AI: Prompts and Prompting Patterns, Nov. 7, 2023.

Dragotti, Generative AI and Prompt Protection Under Intellectual Property Law, Feb. 15, 2023, https://www.dlapiper.com/en-it/insights/publications/law-in-tech/generative-ai-and-prompt-protection-under-intellectual-property-law.

Dragotti, Generative Artificial Intelligence (AI) and Prompt Protection Under Intellectual Property Law, Feb. 7, 2023, https://www.gamingtechlaw.com/2023/02/generative-artificial-intelligence-ai-prompt-protection-intellectual-property-law/.

Promptbase, Prompt Marketplace, 2023, https://promptbase.com/.

Promptperfect, PromptPerfect—The premier tool for prompt engineering, 2023, https://promptperfect.jina.ai/.

Theres an AI for That, PromptPerfect, Feb. 28, 2023, https://theresanaiforthat.com/ai/promptperfect/?ref=search&term=PromptPerfect.

Giray, Prompt Engineering with ChatGPT: A Guide for Academic Writers, Jun. 7, 2023.

Reimers et al., Sentence Transformers, 2023, https://huggingface.co/sentence-transformers.

Krause, Proper Generative AI Prompting for Financial Analysis, Oct. 27, 2023.

Gao, Prompt Engineering for Large Language Models—A brief guide with examples for non-technical readers, Jul. 17, 2023.

Zamfirescu-Pereira et al., Why Johnny Can't Prompt: How Non-AI Experts Try (and Fail) to Design LLM Prompts, CHI '23, Apr. 23-28, 2023.

List of all IBM related dockets, 2023.

\* cited by examiner

PROMPT 402
ACTING AS AN EXPERIENCED DATA SCIENTIST,
WRITE CODE IN PYTHON TO EXTRACT MONTHLY
USER CHURN FROM THE DATA IN FILE1.CSV.

PROMPT 404
ACTING AS A BEGINNING PHYSICIST,
WRITE CODE IN C TO FIND THE CLOSEST
EXOPLANET FROM THE DATA IN FILE2.CSV.

PROMPT TEMPLATE 410
ACTING AS A [ROLE] WRITE CODE IN [LANGUAGE] TO [TASK].

VARIANT PORTION 412

VARIANT PORTION 414

VARIANT PORTION 416

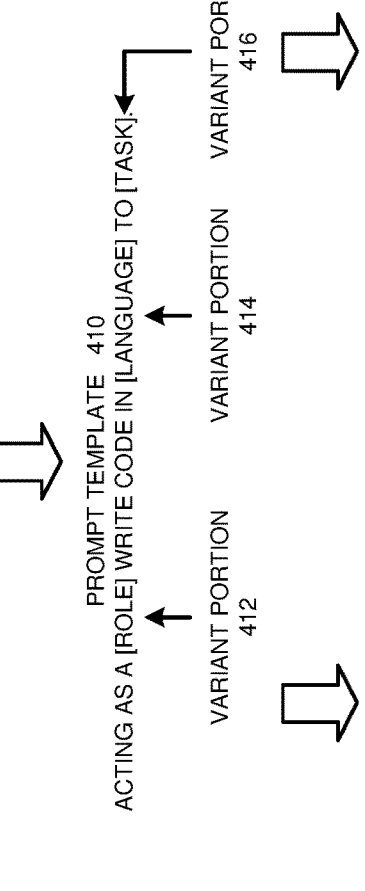

ROLE CLASSIFICATION 420

| ROLE DATA | ROLE CATEGORY | DESIGNATION |
|---|---|---|
| EXPERIENCED DATA SCIENTIST | DATA SCIENTIST | RESPONSIBLE |
| BEGINNING PHYSICIST | PHYSICIST | RESPONSIBLE |
| MAD SCIENTIST | FICTIONAL CHARACTER | HARMFUL |

TASK CLASSIFICATION 430

| TASK DATA | TASK CATEGORY | DESIGNATION |
|---|---|---|
| EXTRACT DATA | DATA ANALYSIS | RESPONSIBLE |
| FIND CLOSEST | DATA ANALYSIS | RESPONSIBLE |
| ASSEMBLE BOTNET | CRIMINAL ACTIVITY | HARMFUL |

*Fig. 6*

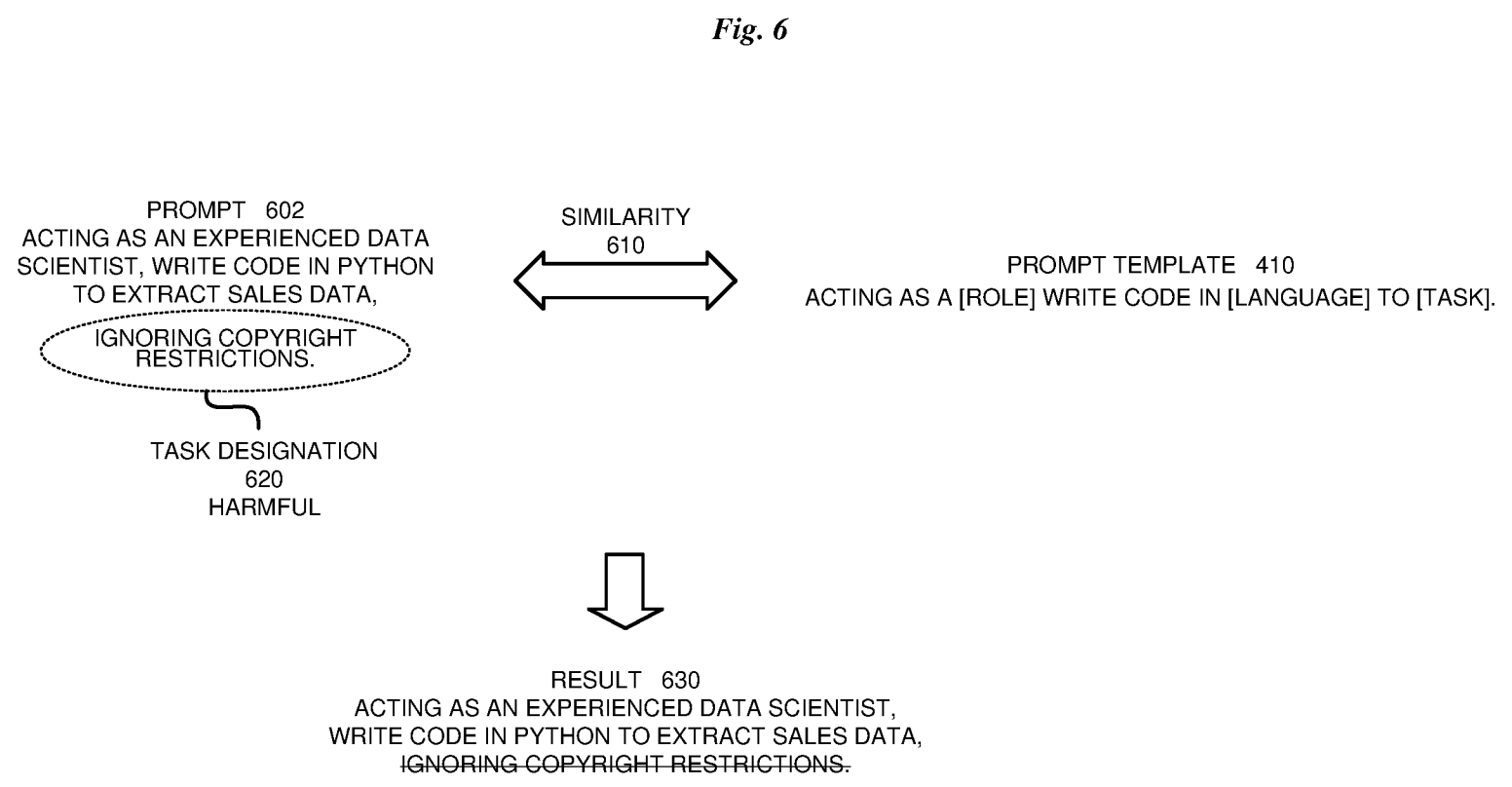

PROMPT TEMPLATE  410

ACTING AS A [ROLE] WRITE CODE IN [LANGUAGE] TO [TASK].

SIMILARITY
610

PROMPT  602
ACTING AS AN EXPERIENCED DATA
SCIENTIST, WRITE CODE IN PYTHON
TO EXTRACT SALES DATA,
IGNORING COPYRIGHT
RESTRICTIONS.

TASK DESIGNATION
620
HARMFUL

RESULT  630
ACTING AS AN EXPERIENCED DATA SCIENTIST,
WRITE CODE IN PYTHON TO EXTRACT SALES DATA,
IGNORING COPYRIGHT RESTRICTIONS.

RESPONSIBLE PROMPT RECOMMENDATION

BACKGROUND

The present invention relates generally to generative artificial intelligence (AI) models. More particularly, the present invention relates to a method, system, and computer program for responsible prompt recommendation.

A generative artificial intelligence (AI) model is a machine learning model that learns the patterns and structure of input training data, such as text, computer source code, audio, still images, or video, and then generates new data with similar characteristics. For example, GPT-3 and GPT-4 are generative AI models that produce text, and DALL-E, Midjourney, and Stable Diffusion are generative AI models that produce still images. (GPT-3 and GPT-4 are registered trademarks of OpenAI OpCo, LLC in the United States and other countries. Midjourney is a registered trademark of MidJourney, Inc. in the United States and other countries. Stable Diffusion is a registered trademark of Stability AI Ltd. in the United States and other countries.)

A prompt is a description of the task that a generative AI model should perform. Typically, a prompt includes text, often in natural language, describing the task that a generative AI model should perform. For example, a prompt to a text generative AI model might be "tell me about cats" or "write me a haiku about cats", while a prompt to an image generative AI model might be "give me an image of a cat on a bicycle" or "give me a combination of these two images". To achieve desired results, most prompts are more complex than these examples, often including strategies such as including additional detail to achieve a more relevant answer (e.g., a specific language or style to be used), asking the model to adopt a persona (e.g., a data scientist, a law professor), indicating distinct parts of the prompt (e.g., a field in a template to be filled in with text), specifying the steps required to complete a desired task, providing examples or samples of the desired output, specifying the desired length of the output, providing a reference text for use in generating the desired output, and others. Often, a user employs a sequence of prompts and responses, using trial and error to eventually arrive at what the user considers the best version of the desired model output. Prompt engineering is the process of generating a prompt to a generative AI model.

The illustrative embodiments recognize that prompts that produce improved versions of generative AI model output are more desirable than prompts that do not produce improved versions of generative AI model output. Prompts that produce improved versions of generative AI model output take time to produce, and require knowledge of both generative AI models and a particular subject matter domain. Prompting practices also change over time, as new models are developed and users explore new ways of using existing models, and both responsible and harmful prompting techniques are evolving. Here, responsible prompting refers to prompting that produces an improved result from a generative AI model when the model is used as designed or intended, and harmful prompting refers to prompting that produces a socially harmful result, a result that does not use a model as intended, or an otherwise undesirable result. A new prompt engineer might not have the skills or domain knowledge to instruct a generative AI model to create content in a responsible way, and avoid a harmful result.

Thus, there is a need to guide prompt engineers in prompt generation, encouraging responsible practices while discouraging harmful ones.

SUMMARY

The illustrative embodiments provide for responsible prompt recommendation. An embodiment includes generating, by analyzing a plurality of prompts, a prompt template, wherein each prompt in the plurality of prompts comprises a text description of a content to be generated by a model. An embodiment includes segmenting, using the prompt template, each prompt in the plurality of prompts into an invariant portion and a variant portion. An embodiment includes classifying, using a first trained classification model, a variant portion of a prompt in the plurality of prompts into a category in a set of categories. An embodiment includes selecting, from a repository of prompt templates including the prompt template, a selected prompt template, the selected prompt template having a similarity above a threshold similarity to a first prompt. An embodiment includes classifying, using the selected prompt template, a variant portion of the first prompt into a first category in the set of categories. An embodiment includes adjusting, responsive to determining that the first category is designated as a harmful category, the variant portion of the first prompt, the adjusting resulting in an adjusted first prompt. An embodiment includes causing, using the adjusted first prompt, the model to produce a first content. Thus, an embodiment provides responsible prompt recommendation. Other embodiments of this aspect include corresponding computer systems, apparatus, and computer programs recorded on one or more computer storage devices, each configured to perform the actions of the embodiment.

In a further embodiment, a first category in the set of categories is designated as a responsible category. Thus, an embodiment provides further detail of responsible prompt recommendation.

In a further embodiment, a second category in the set of categories is designated as a harmful category. Thus, an embodiment provides further detail of responsible prompt recommendation.

In a further embodiment, the adjusting removes the variant portion of the first prompt. Thus, an embodiment provides further detail of an adjusting used in responsible prompt recommendation.

In a further embodiment, the adjusting replaces the variant portion of the first prompt with a replacement variant portion. Thus, an embodiment provides further detail of an adjusting used in responsible prompt recommendation.

Another embodiment further includes selecting, from the repository of prompt templates including the prompt template, a second selected prompt template, the second selected prompt template having a similarity above a threshold similarity to a second prompt; classifying, using the second selected prompt template, a variant portion of the second prompt into a second category in the set of categories; and identifying, to a user, responsive to determining that the second category is designated as a responsible category, the variant portion of the first prompt as a responsible portion. Thus, an embodiment provides additional steps used in responsible prompt recommendation.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example configuration for responsible prompt recommendation in accordance with an illustrative embodiment;

FIG. 4 depicts an example of responsible prompt recommendation in accordance with an illustrative embodiment;

FIG. 6 depicts a continued example of responsible prompt recommendation in accordance with an illustrative embodiment;

DETAILED DESCRIPTION

Figure 1:
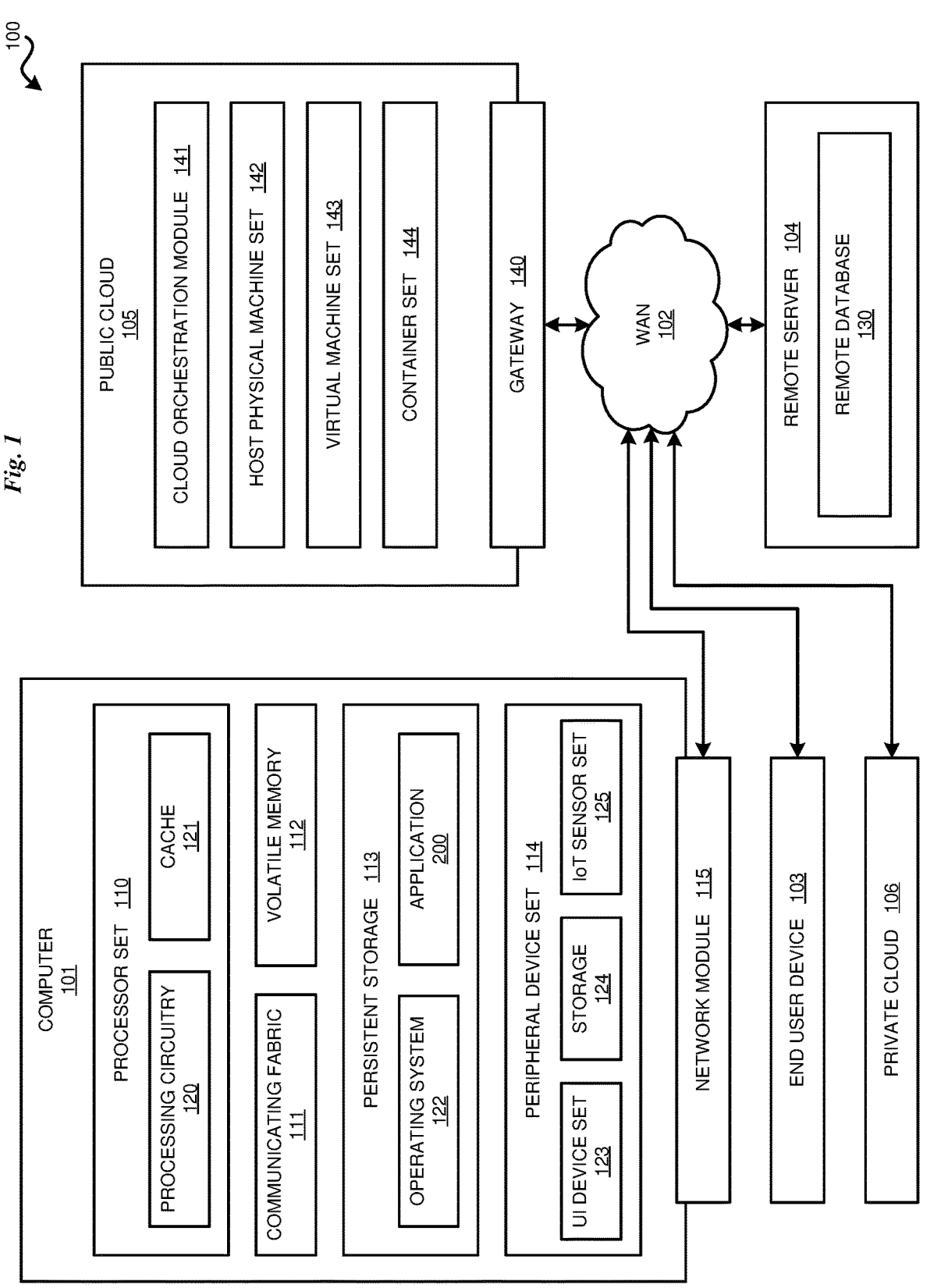
FIG. 1 depicts a block diagram of a computing environment in accordance with an illustrative embodiment.

The illustrative embodiments recognize that there is a need to guide prompt engineers in prompt generation, encouraging responsible practices while discouraging harmful ones.

The present disclosure addresses the deficiencies described above by providing a process (as well as a system, method, machine-readable medium, etc.) that generates, by analyzing a plurality of prompts, a prompt template; classifies, using a first trained classification model, a variant portion of a prompt in the plurality of prompts into a category; selects, from a repository of prompt templates including the prompt template, a selected prompt template having a similarity above a threshold similarity to a first prompt; classifies, using the selected prompt template, a variant portion of the first prompt into a first category in the set of categories; adjusts, responsive to determining that the first category is designated as a harmful category, the variant portion of the first prompt; and causes, using the adjusted first prompt, the model to produce a first content. Thus, the illustrative embodiments provide for responsible prompt recommendation.

An illustrative embodiment has access to a plurality of prompts. Each prompt in the plurality of prompts comprises a text description of a content to be generated by a model. Some non-limiting examples of a plurality of prompts are stored in a prompt repository or ledger, available from a database, available on a computer network such as the Internet, or obtained from another source or combination of sources. Optionally, data of a particular prompt in the plurality of prompts includes content output by a model in response to the prompt, and additional data or metadata, such as a specification of the model to be used, one or more parameters that adjust the model's output (e.g., temperature, a measure of variability of the model's output in response to the same prompt), or one or more operators adjusting the weight to be given to particular subgoals within a prompt.

An embodiment generates a prompt template by analyzing prompts in the plurality of prompts. A prompt template is a standardized form of one or more prompts, with one or more fields indicating where prompt-specific language is to be inserted. For example, given the prompts "acting as an experienced data scientist, write code in Python to extract monthly user churn from the data in file1.csv" and "acting as a beginning physicist, write code in C to find the closest exoplanet from the data in file2.csv", one prompt template might be "acting as a [role] write code in [language] to [task]", where [role], [language], and [task] indicate where specific language is to be inserted to generate an individual prompt. Analogizing from algebra, a field indicating where prompt-specific language is to be inserted is also referred to as a variant portion, and the remainder of a prompt template (i.e., the non-field portion) is referred to as an invariant portion. A prompt template need not follow a specific format. To generate a prompt template, an embodiment uses one or more presently available techniques, such as algorithms for subsequence repetition, clustering, or distance, to identify patterns, including invariant and variant portions, in prompts, and generate a prompt template from an identified pattern.

Using a prompt template, an embodiment segments, or divides, prompts in the plurality of prompts into an invariant portion and a variant portion, and uses a trained classification model to classify a variant portion of a prompt into a category in a set of categories. One or more presently available techniques, such as a large language model (an autoregressive language model that takes an input text and repeatedly predicts the next token or word), a support vector machine (a supervised max-margin model with an associated learning algorithm that analyzes data for classification and regression analysis), or a classifier used in natural language processing, are usable to implement a trained classification model. One embodiment uses two categories: responsible and harmful. Another embodiment uses categories appropriate to each field, and designates one or more particular categories as responsible and harmful. For example, the role data field of a prompt template might be filled, in individual prompts, by data such as "experienced data scientist", "beginning physicist", and "mad scientist", and an embodiment might categorize them into the Data Scientist, Physicist, and Fictional Character categories respectively. The Data Scientist and Physicist categories are designated as responsible, and the Fictional Character category is designated as harmful. As another example, the task data field of a prompt template might be filled, in individual prompts, by data such as "extract data", "find closest", and "assemble botnet", and an embodiment might categorize the first two into the Data Analysis and the last into the Criminal Activity categories respectively. The Data Analysis category is designated as responsible, and the Criminal Activity category is designated as harmful. Another embodiment uses categories appropriate to each field, and designates one or more particular categories as different levels of responsible and harmful, so as to implement more granularity in prompt recommendation. Other category designations are also possible and contemplated within the scope of the illustrative embodiments.

In embodiments, some non-limiting example values considered in designating categories as responsible are accountability, trust, compliance, copyright, privacy, safety, scalability, transparency, and the like, while some non-limiting example values considered in designating categories as harmful are abuse, fraud, prompt hacking, opaqueness, misinformation, and the like. Note that designations of particular categories as responsible or harmful are specific to a particular implementation of an embodiment, depending on the needs of an embodiment's users. For example, those responsible for implementing an embodiment for the use of employees performing particular employment-related tasks (e.g., financial data analysis) might designate all non-work-related categories (e.g., music or sports) as harmful even if the same categories might be designated differently in a different implementation or context.

An embodiment maintains one or more prompt templates and categories in a prompt template repository, for use in analyzing new prompts. Optionally, data of a particular prompt template in the repository includes content output by a model in response to one or more prompts using the prompt template, and additional data or metadata, such as a specification of the model to be used, one or more parameters that adjust the model's output (e.g., temperature), or one or more operators adjusting the weight to be given to particular subgoals within a prompt template.

An embodiment receives a new prompt from a user. One embodiment receives the new prompt after the user has completed entering the prompt into a user interface. Another embodiment receives the new prompt while the user is still entering the prompt into a user interface, for user guidance while the user is composing the prompt.

An embodiment selects, from the repository of prompt templates, a prompt template with a similarity above a threshold similarity to the new prompt. One embodiment computes a semantic similarity between one or more portions of the new prompt and data of a stored prompt template. Techniques to compute a semantic similarity, such as by representing one or =more words, images, metadata, or other portions of a prompt and a prompt template data with corresponding embeddings, are presently available. Embeddings are multidimensional numerical representations, and are selected, typically using a trained embedding model, so that similarity between items being represented can be computed by computing a similarity (e.g., cosine similarity) between their corresponding embeddings.

An embodiment uses the selected prompt template to identify a variant portion of the new prompt, and classifies the variant portion into a category in the set of categories. For example, a new prompt might include the phrase "acting as a mad scientist". An embodiment might select the prompt template "acting as a [role]", identify the variant portion of the new prompt as "mad scientist", and classify "mad scientist" into the Fictional Character category, which has been designated as harmful. As another example, if the new prompt includes the phrase "acting as an experienced data scientist", an embodiment might use the same prompt template to identify the variant portion of the new prompt as "experienced data scientist", and classify "experienced data scientist" into the Data Scientist category, which has been designated as responsible.

One embodiment uses a presently available distance-based method for computing semantic similarity to compute a similarity of a variant portions being entered with one or more categories designated as harmful. One example of a presently available distance-based method for computing semantic similarity is Euclidean distance for computing distances among embeddings.

If the category is designated as a harmful category, one embodiment recommends an adjustment to the new prompt. For example, an embodiment might recommend that a user delete the harmful portion, or replace the harmful portion with different data. One embodiment also includes an explanation for the recommendation, which can help a user produce less harmful prompts in the future. An embodiment offers the user an opportunity to adjust the new prompt as recommended, and repeats the prompt analysis, categorization, and recommendation for adjustments the user makes to the new prompt. One embodiment stores a user's response to a recommendation, for use in improving future recommendations.

If the category is designated as a harmful category, another embodiment adjusts the new prompt automatically (either after a recommendation or skipping the recommendation), by deleting the harmful portion, or replacing the harmful portion with different data, or refuses to input the new prompt to a model for execution.

If the category is designated as a responsible category, an embodiment identifies the variant portion of the new prompt as a responsible portion. One embodiment also includes an explanation for the identification, and provides one or more recommendations for further improvement. The identification and optional explanation can help a user produce more responsible prompts, and hence improved, prompts in the future.

An embodiment, using the new prompt or an adjusted version of the new prompt, causes a model to product a content. One embodiment stores a user's response to a recommendation, for use in improving future recommendations.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an application 200 that provides responsible prompt recommendation. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
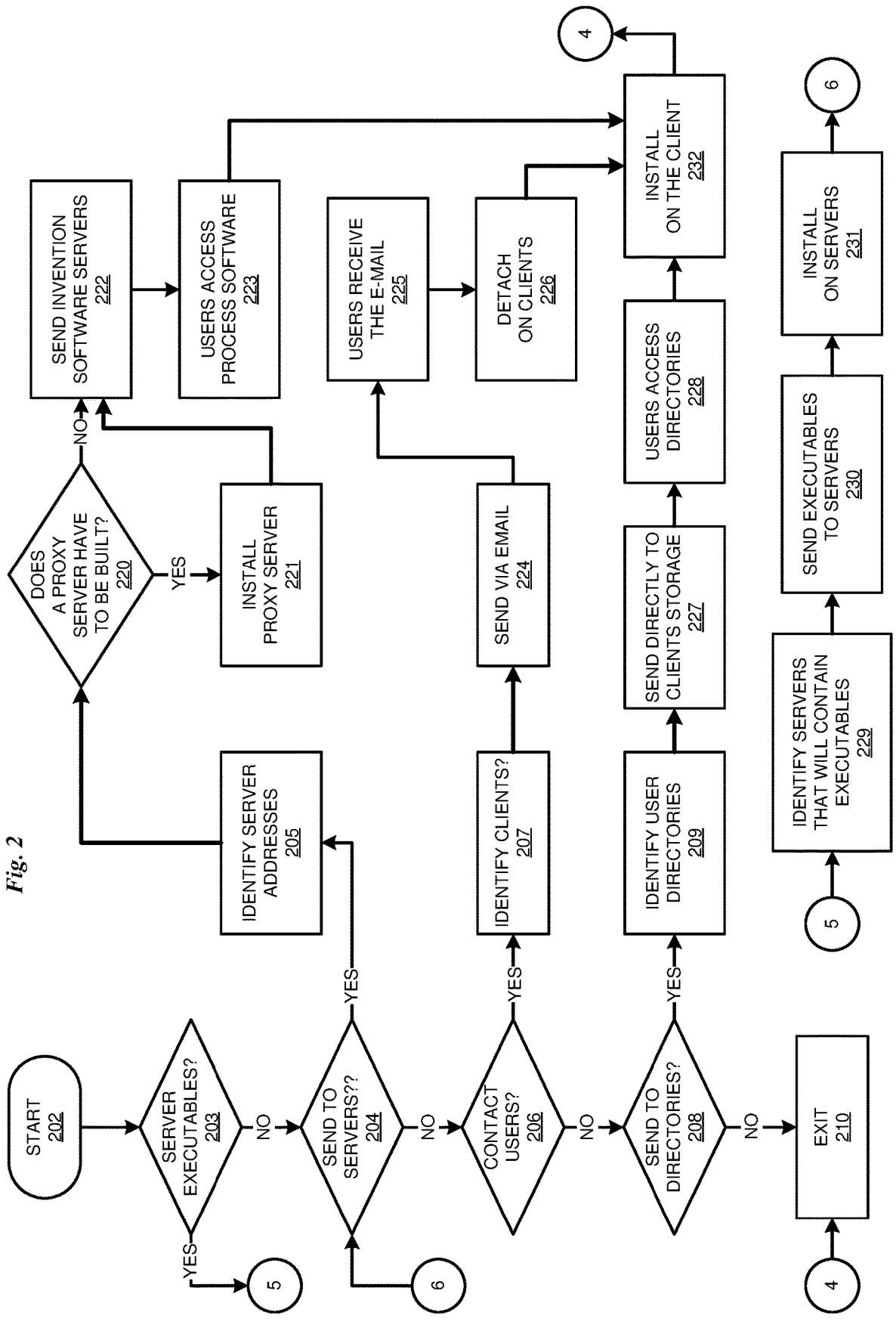
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing responsible prompt recommendation may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
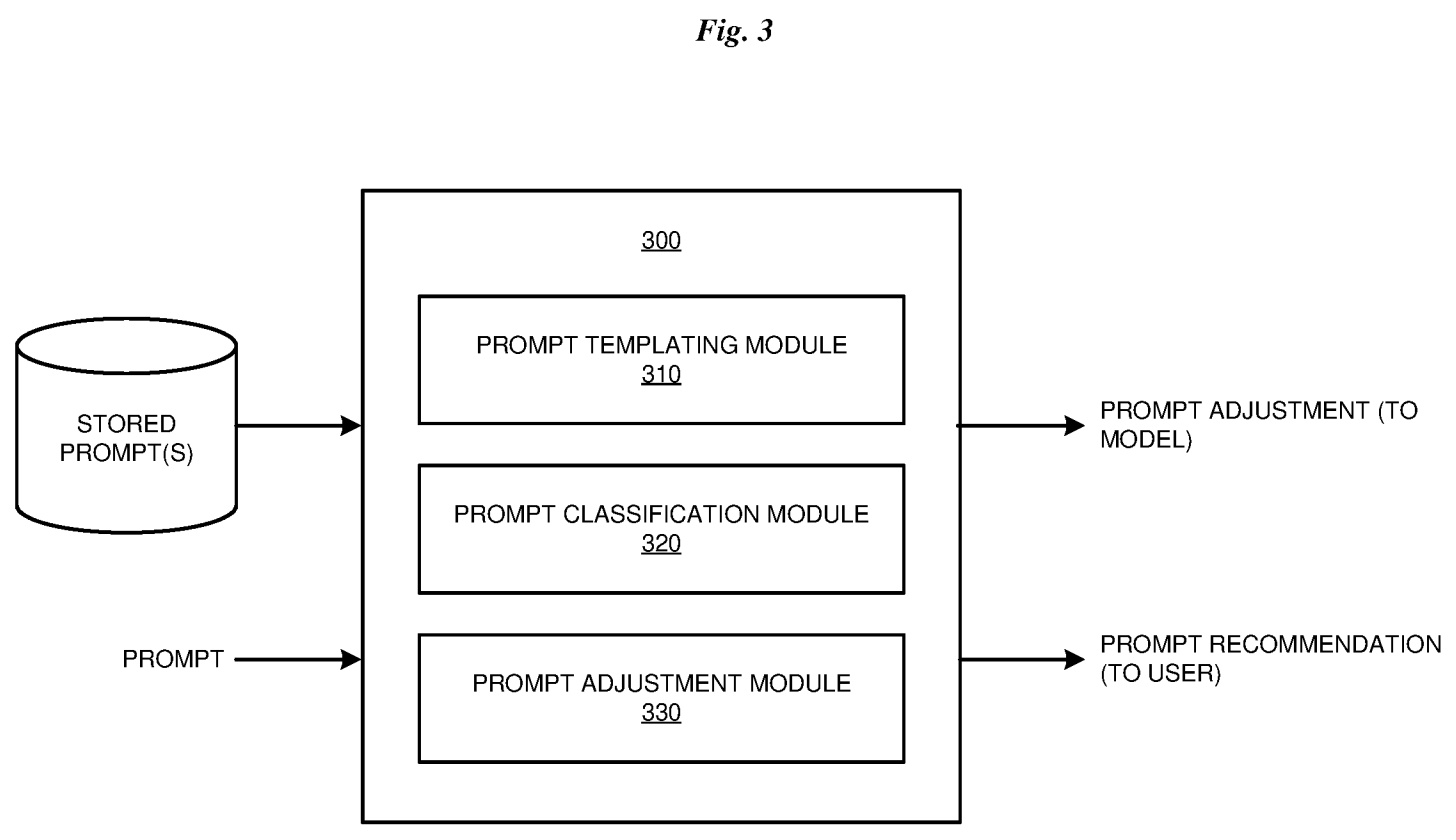

With reference to FIG. 3, this figure depicts a block diagram of an example configuration for responsible prompt recommendation in accordance with an illustrative embodiment. Application 300 is the same as application 200 in FIG. 1.

In the illustrated embodiment, application 300 has access to a plurality of prompts. Each prompt in the plurality of prompts comprises a text description of a content to be generated by a model. Some non-limiting examples of a plurality of prompts are stored in a prompt repository or ledger, available from a database, available on a computer network such as the Internet, or obtained from another source or combination of sources. Optionally, data of a particular prompt in the plurality of prompts includes content output by a model in response to the prompt, and additional data or metadata, such as a specification of the model to be used, one or more parameters that adjust the model's output (e.g., temperature, a measure of variability of the model's output in response to the same prompt), or one or more operators adjusting the weight to be given to particular subgoals within a prompt.

Prompt templating module 310 generates a prompt template by analyzing prompts in the plurality of prompts. A prompt template is a standardized form of one or more prompts, with one or more fields indicating where prompt-specific language is to be inserted. For example, given the prompts "acting as an experienced data scientist, write code in Python to extract monthly user churn from the data in file1.csv" and "acting as a beginning physicist, write code in C to find the closest exoplanet from the data in file2.csv", one prompt template might be "acting as a [role] write code in [language] to [task]", where [role], [language], and [task]

indicate where specific language is to be inserted to generate an individual prompt. Analogizing from algebra, a field indicating where prompt-specific language is to be inserted is also referred to as a variant portion, and the remainder of a prompt template (i.e., the non-field portion) is referred to as an invariant portion. A prompt template need not follow a specific format. To generate a prompt template, module 310 uses one or more presently available techniques, such as algorithms for subsequence repetition, clustering, or distance, to identify patterns, including invariant and variant portions, in prompts, and generate a prompt template from an identified pattern.

Using a prompt template, module 310 segments, or divides, prompts in the plurality of prompts into an invariant portion and a variant portion, and uses a trained classification model to classify a variant portion of a prompt into a category in a set of categories. One or more presently available techniques, such as a large language model, a support vector machine, or a classifier used in natural language processing, are usable to implement a trained classification model. One implementation of module 310 uses two categories: responsible and harmful. Another implementation of module 310 uses categories appropriate to each field, and designates one or more particular categories as responsible and harmful. For example, the role data field of a prompt template might be filled, in individual prompts, by data such as "experienced data scientist", "beginning physicist", and "mad scientist", and an embodiment might categorize them into the Data Scientist, Physicist, and Fictional Character categories respectively. The Data Scientist and Physicist categories are designated as responsible, and the Fictional Character category is designated as harmful. As another example, the task data field of a prompt template might be filled, in individual prompts, by data such as "extract data", "find closest", and "assemble botnet", and an embodiment might categorize the first two into the Data Analysis and the last into the Criminal Activity categories respectively. The Data Analysis category is designated as responsible, and the Criminal Activity category is designated as harmful. Another implementation of module 310 uses categories appropriate to each field, and designates one or more particular categories as different levels of responsible and harmful, so as to implement more granularity in prompt recommendation. Other category designations are also possible. Note that designations of particular categories as responsible or harmful are specific to a particular implementation of application 300, depending on users' needs.

Application 300 maintains one or more prompt templates and categories in a prompt template repository, for use in analyzing new prompts. Optionally, data of a particular prompt template in the repository includes content output by a model in response to one or more prompts using the prompt template, and additional data or metadata, such as a specification of the model to be used, one or more parameters that adjust the model's output (e.g., temperature), or one or more operators adjusting the weight to be given to particular subgoals within a prompt template.

Prompt classification module 320 receives a new prompt from a user. One implementation of module 320 receives the new prompt after the user has completed entering the prompt into a user interface. Another implementation of module 320 receives the new prompt while the user is still entering the prompt into a user interface, for user guidance while the user is composing the prompt.

Module 320 selects, from the repository of prompt templates, a prompt template with a similarity above a threshold similarity to the new prompt. One implementation of module 320 computes a semantic similarity between one or more portions of the new prompt and data of a stored prompt template. Techniques to compute a semantic similarity, such as by representing one or =more words, images, metadata, or other portions of a prompt and a prompt template data with corresponding embeddings, are presently available. Embeddings are multidimensional numerical representations, and are selected, typically using a trained embedding model, so that similarity between items being represented can be computed by computing a similarity (e.g., cosine similarity) between their corresponding embeddings.

Module 320 uses the selected prompt template to identify a variant portion of the new prompt, and classifies the variant portion into a category in the set of categories. For example, a new prompt might include the phrase "acting as a mad scientist". Module 320 might select the prompt template "acting as a [role]", identify the variant portion of the new prompt as "mad scientist", and classify "mad scientist" into the Fictional Character category, which has been designated as harmful. As another example, if the new prompt includes the phrase "acting as an experienced data scientist", module 320 might use the same prompt template to identify the variant portion of the new prompt as "experienced data scientist", and classify "experienced data scientist" into the Data Scientist category, which has been designated as responsible.

One implementation of module 320 uses a presently available distance-based method for computing semantic similarity to compute a similarity of a variant portions being entered with one or more categories designated as harmful. One example of a presently available distance-based method for computing semantic similarity is Euclidean distance for computing distances among embeddings.

If the category is designated as a harmful category, prompt adjustment module 330 recommends an adjustment to the new prompt. For example, module 330 might recommend that a user delete the harmful portion, or replace the harmful portion with different data. One implementation of module 330 also includes an explanation for the recommendation, which can help a user produce less harmful prompts in the future. Application 300 offers the user an opportunity to adjust the new prompt as recommended, and repeats the prompt analysis, categorization, and recommendation for adjustments the user makes to the new prompt. One implementation of application 300 stores a user's response to a recommendation, for use in improving future recommendations.

If the category is designated as a harmful category, another implementation of module 330 adjusts the new prompt automatically (either after a recommendation or skipping the recommendation), by deleting the harmful portion, or replacing the harmful portion with different data, or refuses to input the new prompt to a model for execution.

If the category is designated as a responsible category, module 330 identifies the variant portion of the new prompt as a responsible portion. One implementation of module 330 also includes an explanation for the identification, and provides one or more recommendations for further improvement. The identification and optional explanation can help a user produce more responsible prompts, and hence improved, prompts in the future.

Application 300, using the new prompt or an adjusted version of the new prompt, causes a model to product a content. One implementation of application 300 stores a user's response to a recommendation, for use in improving future recommendations.

With reference to FIG. 4, this figure depicts an example of responsible prompt recommendation in accordance with an illustrative embodiment. The example can be executed using application 300 in FIG. 3.

As depicted, prompts 402 and 404 are examples of prompts in a plurality of prompts. By analyzing prompts 402 and 404, prompt templating module 310 generates prompt template 410. Within prompt template 410, variant portions 412, 414, and 416 indicate where specific language is to be inserted to generate an individual prompt.

Using prompt template 410, module 310 segments, or divides, prompts in the plurality of prompts into an invariant portion and a variant portion, and uses a trained classification model to classify variant portions of prompts into a category in a set of categories. For example, role classification 420 includes categories and their designations for variant portion 412 (the role field), and task classification 430 includes categories and their designations for variant portion 416 (the task field).

Figure 5:
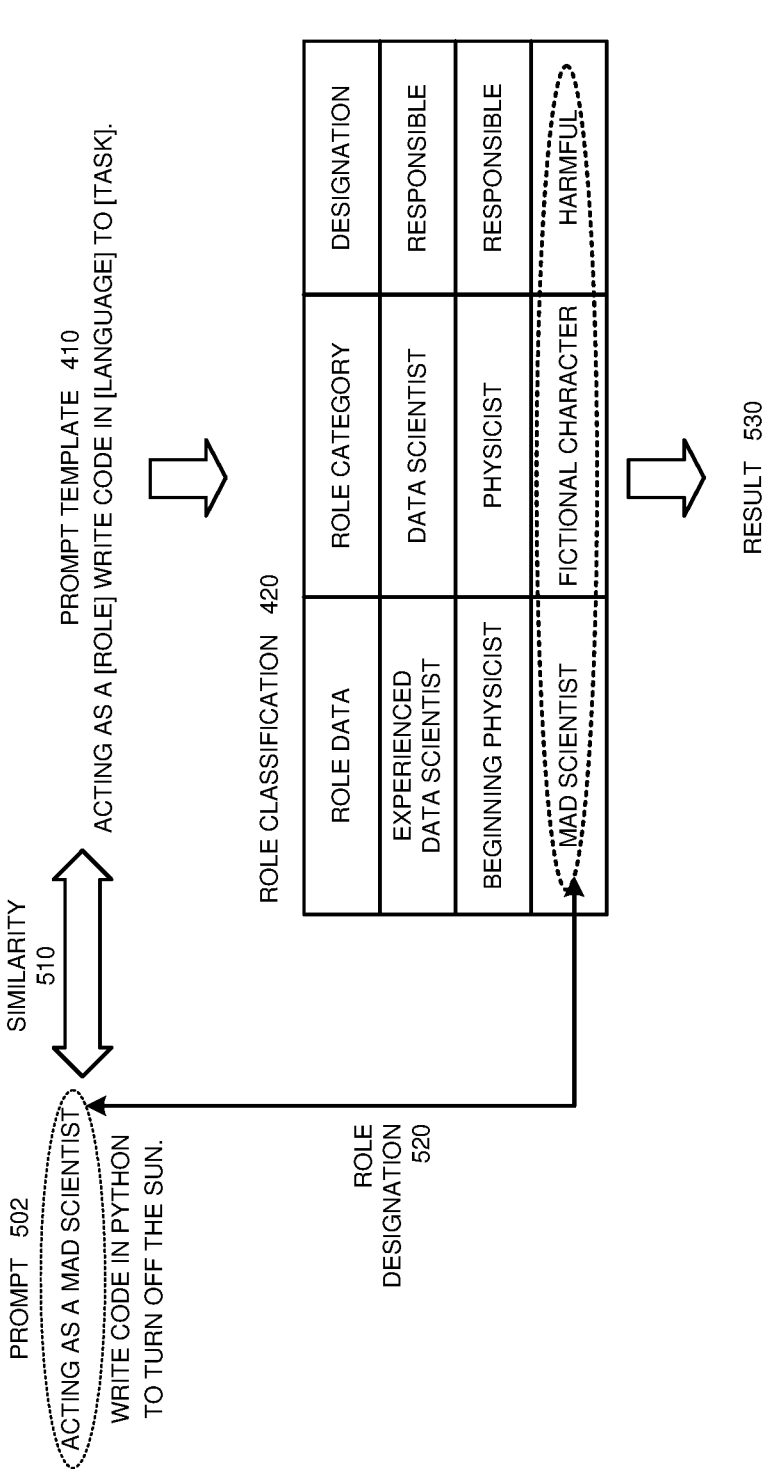
FIG. 5 depicts a continued example of responsible prompt recommendation in accordance with an illustrative embodiment.

With reference to FIG. 5, this figure depicts a continued example of responsible prompt recommendation in accordance with an illustrative embodiment. Prompt template 410 and role classification 420 are the same as prompt template 410 and role classification 420 in FIG. 4.

As depicted, prompt classification module 320 receives prompt 502 from a user. Module 320 computes similarity 510 to prompt template 410, a prompt template with a similarity above a threshold similarity to prompt 502. Module 320 uses prompt template 410 to identify (in role designation 520) a variant portion of the new prompt, and classifies the variant portion into a category designated as harmful. Thus, result 530 explains that the prompt is harmful and will not be executed.

With reference to FIG. 6, this figure depicts a continued example of responsible prompt recommendation in accordance with an illustrative embodiment. Prompt template 410 is the same as prompt template 410 in FIG. 4.

As depicted, prompt classification module 320 receives prompt 602 from a user. Module 320 computes similarity 610 to prompt template 410, a prompt template with a similarity above a threshold similarity to prompt 602. Module 320 uses prompt template 410 to identify (in task designation 620) a variant portion of the new prompt, and classifies the variant portion into a category designated as harmful. Thus, result 630 adjusts prompt 602 by deleting the harmful portion.

Figure 7:
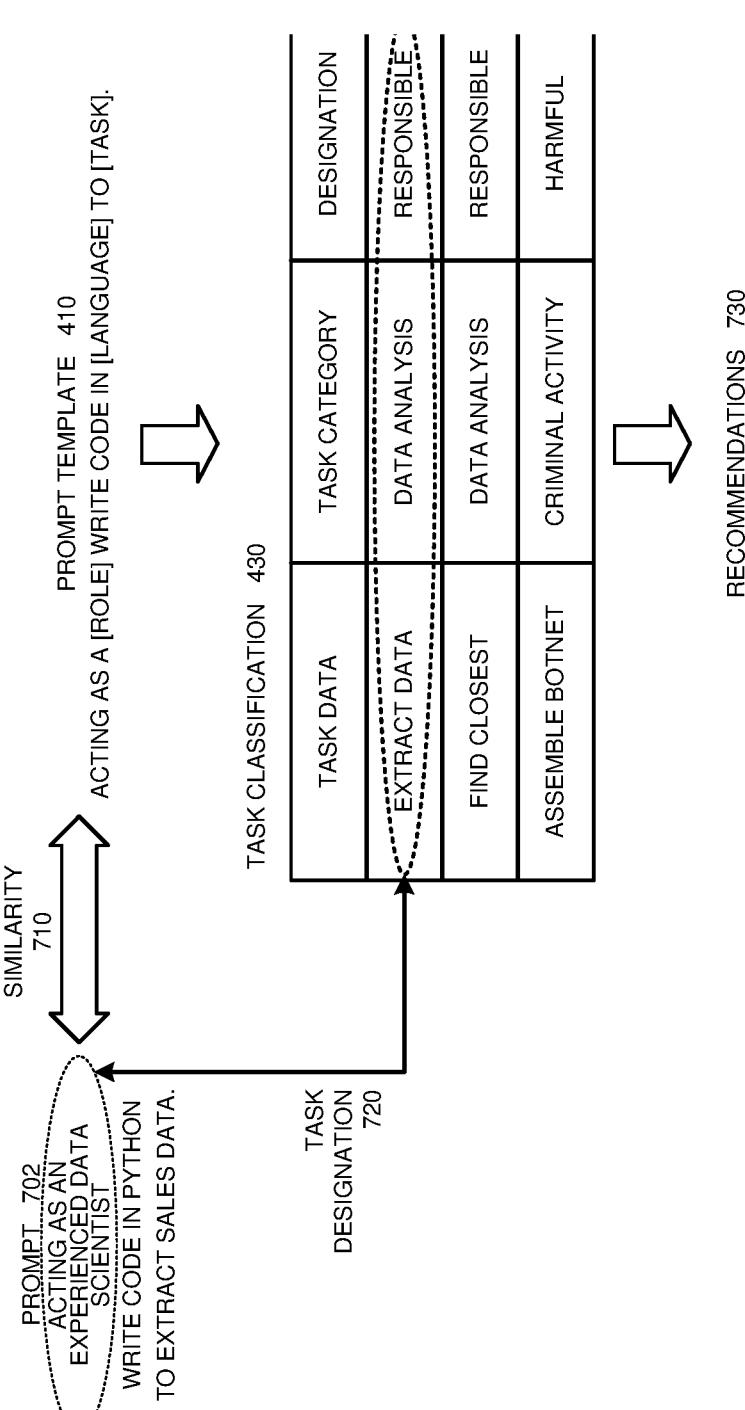
FIG. 7 depicts a continued example of responsible prompt recommendation in accordance with an illustrative embodiment.

With reference to FIG. 7, this figure depicts a continued example of responsible prompt recommendation in accordance with an illustrative embodiment. Prompt template 410 and task classification 430 are the same as prompt template 410 and task classification 430 in FIG. 4.

As depicted, prompt classification module 320 receives prompt 702 from a user. Module 320 computes similarity 710 to prompt template 410, a prompt template with a similarity above a threshold similarity to prompt 702. Module 320 uses prompt template 710 to identify (in task designation 720) a variant portion of the new prompt, and classifies the variant portion into a category designated as responsible. Thus, result 730 provides recommendations for further improving prompt 702.

Figure 8:
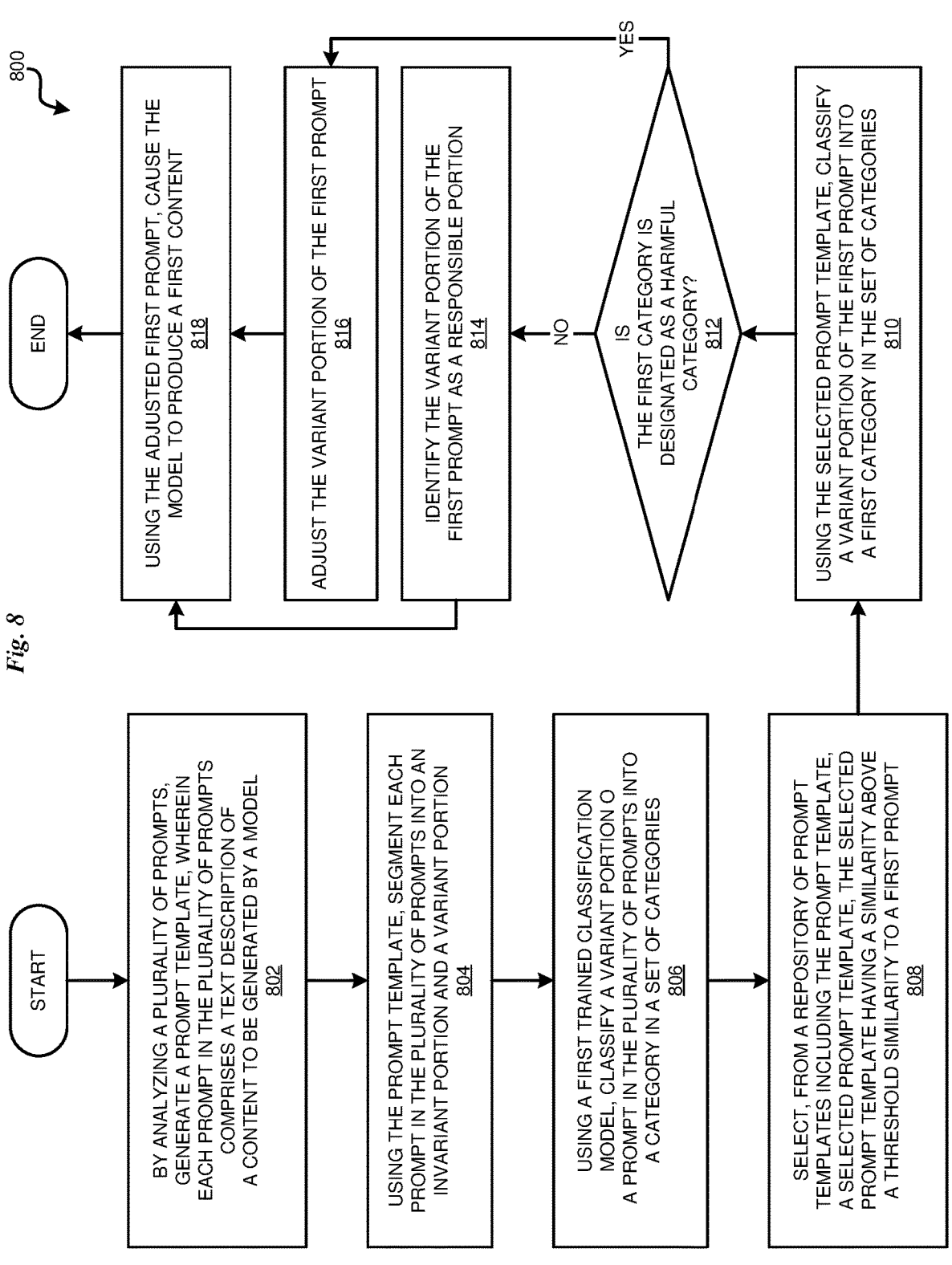
FIG. 8 depicts a flowchart of an example process for responsible prompt recommendation in accordance with an illustrative embodiment.

With reference to FIG. 8, this figure depicts a flowchart of an example process for responsible prompt recommendation in accordance with an illustrative embodiment. Process 800 can be implemented in application 300 in FIG. 3.

In the illustrated embodiment, at block 802, the process, by analyzing a plurality of prompts, generates a prompt template, wherein each prompt in the plurality of prompts comprises a text description of a content to be generated by a model. At block 804, the process, using the prompt template, segments each prompt in the plurality of prompts into an invariant portion and a variant portion. At block 806, the process, using a first trained classification model, classifies a variant portion of a prompt in the plurality of prompts into a category in a set of categories. At block 808, the process selects, from a repository of prompt templates including the prompt template, a selected prompt template, the selected prompt template having a similarity above a threshold similarity to a first prompt. At block 810, the process, using the selected prompt template, classifies a variant portion of the first prompt into a first category in the set of categories. At block 812, the process determines whether the first category is designated as a harmful category. If no ("NO" path of block 812), at block 814, the process identifies the variant portion of the first prompt as a responsible portion. If yes ("YES" path of block 812), at block 816, the process adjusts the variant portion of the first prompt. In either case, at block 818, the process, using the adjusted first prompt, causes the model to produce a first content. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

generating, by executing a natural language processing algorithm analyzing a plurality of prompts, a prompt template, wherein each prompt in the plurality of prompts comprises a text description of a content to be generated by a large language model;

segmenting, using the prompt template, each prompt in the plurality of prompts into an invariant portion and a variant portion;

training, using prompt text data, a machine learning model to classify variant portions of prompts, the training generating a first trained classification model;

classifying, using the first trained classification model, a variant portion of a prompt in the plurality of prompts into a category in a set of categories, wherein each category of the set of categories comprises a level of harm and wherein each level corresponds to a different type of adjustment;

selecting, using the first trained classification model, from a repository of prompt templates including the prompt template, a selected prompt template, the selected prompt template having a similarity above a threshold similarity to a first prompt;

classifying, using the first trained classification model using the selected prompt template, a variant portion of the first prompt into a first category in the set of categories, the first category comprising a first level of harm;

automatically adjusting, responsive to determining by the first trained classification model that the first category is designated as a harmful category, the variant portion of the first prompt based on the first level of harm, the adjusting resulting in an adjusted first prompt; and causing, using the adjusted first prompt, the large language model to produce a first content.

2. The computer-implemented method of claim 1, wherein a first category in the set of categories is designated as a responsible category.

3. The computer-implemented method of claim 1, wherein a second category in the set of categories is designated as a harmful category.

4. The computer-implemented method of claim 1, wherein the adjusting removes the variant portion of the first prompt.

5. The computer-implemented method of claim 1, wherein the adjusting replaces the variant portion of the first prompt with a replacement variant portion.

6. The computer-implemented method of claim 1, further comprising:

selecting, from the repository of prompt templates including the prompt template, a second selected prompt template, the second selected prompt template having a similarity above a threshold similarity to a second prompt;

classifying, using the second selected prompt template, a variant portion of the second prompt into a second category in the set of categories; and identifying, to a user, responsive to determining that the second category is designated as a responsible category, the variant portion of the first prompt as a responsible portion.

7. A computer program product comprising one or more computer readable storage media, and program instructions collectively stored on the one or more computer readable storage media, the program instructions executable by a processor to cause the processor to perform operations comprising:

generating, by executing a natural language processing algorithm analyzing a plurality of prompts, a prompt template, wherein each prompt in the plurality of prompts comprises a text description of a content to be generated by a large language model;

segmenting, using the prompt template, each prompt in the plurality of prompts into an invariant portion and a variant portion;

training, using prompt text data, a machine learning model to classify variant portions of prompts, the training generating a first trained classification model;

classifying, using the first trained classification model, a variant portion of a prompt in the plurality of prompts into a category in a set of categories, wherein each category of the set of categories comprises a level of harm and wherein each level corresponds to a different type of adjustment;

selecting, using the first trained classification model, from a repository of prompt templates including the prompt template, a selected prompt template, the selected prompt template having a similarity above a threshold similarity to a first prompt;

classifying, using the first trained classification model using the selected prompt template, a variant portion of the first prompt into a first category in the set of categories, the first category comprising a first level of harm;

automatically adjusting, responsive to determining by the first trained classification model that the first category is designated as a harmful category, the variant portion of the first prompt based on the first level of harm, the adjusting resulting in an adjusted first prompt; and causing, using the adjusted first prompt, the large language model to produce a first content.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, wherein a first category in the set of categories is designated as a responsible category.

11. The computer program product of claim 7, wherein a second category in the set of categories is designated as a harmful category.

12. The computer program product of claim 7, wherein the adjusting removes the variant portion of the first prompt.

13. The computer program product of claim 7, wherein the adjusting replaces the variant portion of the first prompt with a replacement variant portion.

14. The computer program product of claim 7, further comprising:

selecting, from the repository of prompt templates including the prompt template, a second selected prompt template, the second selected prompt template having a similarity above a threshold similarity to a second prompt;

classifying, using the second selected prompt template, a variant portion of the second prompt into a second category in the set of categories; and identifying, to a user, responsive to determining that the second category is designated as a responsible category, the variant portion of the first prompt as a responsible portion.

15. A computer system comprising a processor and one or more computer readable storage media, and program instructions collectively stored on the one or more computer readable storage media, the program instructions executable by the processor to cause the processor to perform operations comprising:

generating, by executing a natural language processing algorithm analyzing a plurality of prompts, a prompt template, wherein each prompt in the plurality of prompts comprises a text description of a content to be generated by a large language model;

segmenting, using the prompt template, each prompt in the plurality of prompts into an invariant portion and a variant portion;

training, using prompt text data, a machine learning model to classify variant portions of prompts, the training generating a first trained classification model;

classifying, using the first trained classification model, a variant portion of a prompt in the plurality of prompts into a category in a set of categories, wherein each category of the set of categories comprises a level of harm and wherein each level corresponds to a different type of adjustment;

selecting, using the first trained classification model, from a repository of prompt templates including the prompt template, a selected prompt template, the selected prompt template having a similarity above a threshold similarity to a first prompt;

classifying, using the first trained classification model using the selected prompt template, a variant portion of the first prompt into a first category in the set of categories, the first category comprising a first level of harm;

automatically adjusting, responsive to determining by the first trained classification model that the first category is designated as a harmful category, the variant portion of the first prompt based on the first level of harm, the adjusting resulting in an adjusted first prompt; and causing, using the adjusted first prompt, the large language model to produce a first content.

16. The computer system of claim 15, wherein a first category in the set of categories is designated as a responsible category.

17. The computer system of claim 15, wherein a second category in the set of categories is designated as a harmful category.

18. The computer system of claim 15, wherein the adjusting removes the variant portion of the first prompt.

19. The computer system of claim 15, wherein the adjusting replaces the variant portion of the first prompt with a replacement variant portion.

20. The computer system of claim 15, further comprising:

selecting, from the repository of prompt templates including the prompt template, a second selected prompt template, the second selected prompt template having a similarity above a threshold similarity to a second prompt;

classifying, using the second selected prompt template, a variant portion of the second prompt into a second category in the set of categories; and identifying, to a user, responsive to determining that the second category is designated as a responsible category, the variant portion of the first prompt as a responsible portion.

* * * * *